(12) United States Patent
Schenk et al.

(10) Patent No.: US 8,463,479 B2
(45) Date of Patent: Jun. 11, 2013

(54) METHOD FOR OPERATING A MOTOR VEHICLE

(75) Inventors: Joachim Schenk, Seershausen (DE); Matthias Bindseil, Veckenstedt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/326,588

(22) Filed: Dec. 15, 2011

(65) Prior Publication Data

US 2012/0166027 A1    Jun. 28, 2012

(30) Foreign Application Priority Data

Dec. 23, 2010 (DE) .......................... 10 2010 064 058

(51) Int. Cl.
*B60W 20/00* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 4,805,751 A | 2/1989 | Ohkumo et al. | |
| 4,830,155 A | 5/1989 | Ohkumo et al. | |
| 4,848,544 A | 7/1989 | Ohkumo et al. | |
| 5,535,123 A * | 7/1996 | Rump et al. | 701/78 |
| 5,660,448 A * | 8/1997 | Kiesewetter et al. | 303/155 |
| 5,669,676 A * | 9/1997 | Rump et al. | 303/125 |
| 5,719,769 A * | 2/1998 | Brugger et al. | 701/70 |
| 6,099,086 A * | 8/2000 | Feigel et al. | 303/113.4 |
| 6,216,067 B1 * | 4/2001 | Baeuerle et al. | 701/33.9 |
| 6,309,031 B1 * | 10/2001 | Crombez et al. | 303/113.4 |
| 6,312,064 B1 * | 11/2001 | Koike et al. | 303/155 |
| 6,324,449 B2 * | 11/2001 | Albert et al. | 701/22 |
| 6,553,304 B2 * | 4/2003 | Walenty et al. | 701/71 |
| 6,792,344 B2 * | 9/2004 | Minowa et al. | 701/96 |
| 7,603,228 B2 * | 10/2009 | Coughlin | 701/123 |
| 7,634,345 B2 * | 12/2009 | Karnjate et al. | 701/70 |
| 7,805,232 B2 * | 9/2010 | Karnjate et al. | 701/70 |
| 2005/0173980 A1 * | 8/2005 | Bohm et al. | 303/155 |
| 2008/0262675 A1 * | 10/2008 | Fischlein et al. | 701/38 |
| 2009/0287378 A1 * | 11/2009 | Jess et al. | 701/48 |
| 2010/0174460 A1 * | 7/2010 | Gibson et al. | 701/54 |

FOREIGN PATENT DOCUMENTS

| | | |
|---|---|---|
| DE | 10 2005 002 265 | 8/2006 |
| WO | WO 2009/144064 | 12/2009 |

* cited by examiner

*Primary Examiner* — Thomas Tarcza
*Assistant Examiner* — Alex C Dunn
(74) *Attorney, Agent, or Firm* — Kenyon & Kenyon LLP

(57) ABSTRACT

In a method for operating a motor vehicle, an actuation speed of a power input element, e.g., an accelerator pedal, is detected and evaluated, and a drag torque is influenced as a function of the detected actuation variable. At least one measure which influences the drag torque is carried out if the following conditions are all satisfied: (i) an actuation speed is less than a limiting value, (ii) a position of the input element is greater than zero, and (iii) the power input element is actuated in the direction of a power reduction.

14 Claims, 4 Drawing Sheets

METHOD FOR OPERATING A MOTOR VEHICLE

BACKGROUND OF THE INVENTION

1. Field of the Invention

The present invention relates to a method for operating a motor vehicle, as well as a computer program and a control device for operating a motor vehicle.

2. Description of Related Art

Driving machines of vehicles are usually operated with the aid of an accelerator pedal, i.e., the pedal is used to transmit a request for a desired driving torque to the driving machine. Methods for converting a position (angle) of the accelerator pedal into an electrical signal are known. This signal is detected by an engine control unit and used to control the driving machine. This principle is used, for example, in gasoline or diesel engines, hybrid drives and electric motors. Methods are furthermore known for using variables derived from the accelerator pedal position to, for example, evaluate a behavior of the driver or to additionally control the driving machine.

Publications in this field are, for example, published international patent application document WO 09144064, U.S. Pat. No. 4,805,751, U.S. Pat. No. 4,848,544, published German patent application document DE102005002265 and U.S. Pat. No. 4,830,155.

BRIEF SUMMARY OF THE INVENTION

An object of the present invention is to provide a method, computer program and a control device for operating a motor vehicle, which method, program and device provide the advantage that a motor vehicle drive may be used particularly efficiently as a function of the position and the actuation speed of a power input element. This makes it possible to protect the environment and save fuel and driving energy.

During operation of the motor vehicle, a position of the power input element is continuously detected and evaluated. An actuation speed of the input element may be ascertained according to the absolute amount and the sign from the ascertained position with the aid of mathematical operations, for example. If the input element is actuated in the direction of a power reduction, a measure which influences the drag torque of the drive may be deduced therefrom. The drive is, for example, a diesel engine, a spark ignition engine, a hybrid drive or an electric drive. The measure influencing the drag torque may be selected in such a way, for example, that a driver's intention ascertained from the actuation speed with regard to the movement of the motor vehicle is supported particularly well. At the same time, manipulated variables of the drive or the motor vehicle may be altered in such a way that a particularly energy-efficient movement of the motor vehicle is subsequently achieved.

If the power input element, for example an accelerator pedal, is moved back by the driver with the intention of reducing the power, two different effects may be intended thereby. In a first case, a so-called sailing mode may be intended, in which the vehicle is not to be further accelerated but rather to coast over a comparatively long distance at a comparatively low negative acceleration or, optionally, the speed is to even be maintained. In a second case, the intention may be to place the motor vehicle in a so-called coasting mode, in which the vehicle speed is additionally reduced by a so-called engine drag torque. This is based on the consideration that the vehicle drive which is not supplied with energy performs an additional braking action due to friction effects, and the vehicle consequently is slowed down at a comparatively high negative acceleration. According to the present invention, the actuation speed of the accelerator pedal is also utilized to distinguish between the two cases. This is accomplished in that one or multiple limiting values are compared to an instantaneous actuation speed of the accelerator pedal.

The present invention is also helpful in connection with automatic distance control systems, which are being used more and more today and are usually based on a measurement of the distance to a vehicle traveling ahead, with the aid of radar. In this case, the power input element may also rather be "virtual," for example, include a control variable of a control and regulating device which is ascertained by taking the distance measurement signals into account.

In particular, it is provided that the measure includes at least reducing a fuel quantity to be injected, preferably discontinuing the fuel injection and influencing the position of the throttle valve of an internal combustion engine which drives the motor vehicle. Discontinuing—or at least reducing—the fuel injection ensures that no or only a small amount of energy is used for the drive during the measure. The drive or the motor vehicle characteristics may be additionally influenced by intentionally controlling the throttling losses with the aid of the position of the throttle valve of the internal combustion engine.

An embodiment of the method provides that the throttle valve is opened all the way when injection is deactivated. This supports the sailing mode of the motor vehicle particularly effectively. The wider the throttle valve is opened, the smaller are the throttling losses brought about thereby, and a drag torque generated by the non-driven internal combustion engine is minimized accordingly. This results in a longer sailing of the vehicle without consuming fuel.

It is furthermore provided that the position of the throttle valve is changed in such a way that a speed of the motor vehicle remains at least approximately the same. This allows the characteristics of the motor vehicle to be set in sailing mode in a more differentiated way. For example, an approximately constant speed of the vehicle may be maintained in this way when driving downhill. The position of the throttle valve may thus be used as an additional, sensitive brake to prevent an undesirably high speed, for example when driving downhill.

The sailing mode of the motor vehicle may take place particularly efficiently if the measure includes opening a clutch which connects the wheels of the motor vehicle to a driving machine driving the motor vehicle. This allows the remaining friction losses of the drive to be maintained at a particularly low level and the consumption of fuel or energy to be minimized.

In addition, it is provided that a driving machine designed as an internal combustion engine is operated in idle mode during an operation in which the clutch is open. This makes it possible to ensure that the essential parts of the drive are decoupled from the wheels and the driving machine is operated using a particularly small amount of energy in this state, without it being necessary to subsequently restart the internal combustion engine.

The method may be applied particularly effectively in sailing mode if the measure includes generating a driving torque with the aid of an electric motor. This allows the motor vehicle speed to be kept approximately constant or a particularly long coasting to be achieved—in particular for a hybrid or electric drive. The driving torque generated by the electric motor is used to compensate for remaining friction losses.

In one embodiment of the method, no fuel is injected and at least one measure which increases the drag torque is carried out if the actuation speed is greater than a limiting value and the position of the input element is reduced to zero. Exceeding the limiting value is used as a criterion for detecting a coasting mode requested by the driver. This means that the vehicle is neither supposed to continue to accelerate nor continue to move at a constant vehicle speed, but instead the vehicle is braked comparatively quickly compared to a sailing mode using a defined braking action. For this purpose, no or only a small amount of fuel is injected or the drive is no longer supplied with energy, on the one hand, and an additional measure which increases the drag torque is carried out, on the other hand.

To achieve this, it is proposed that a torque which increases the drag torque is generated by an electric motor or generator. This allows the kinetic energy of the vehicle to be additionally reduced in a controlled manner. This is advantageous, in particular in hybrid or electric drives in which the energy generated thereby may optionally flow into a battery which allows the overall energy consumption to drop.

Alternatively or additionally, it is provided that a throttle valve of an internal combustion engine which drives the motor vehicle is closed as the measure which increases the drag torque. An effective measure for additionally braking the vehicle is thus also described for a conventional internal combustion engine.

The method according to the present invention may be applied more flexibly if the selection of the measure or measures is a function of a course of the road and/or a traffic situation.

The roadway gradient, other roadway properties, the vehicle speed, the course of the road and/or the traffic situation may thus be taken into account. The traffic situation may be ascertained, for example, from operating variables of the driving machine or the vehicle or from the vehicle movement detected over a previous period of time.

In addition, the method according to the present invention provides that the course of the road is ascertained from the data of a GPS and/or a yaw-rate sensor. The course of the road may be ascertained particularly accurately with the aid of the GPS (global positioning system). In addition, the vehicle movement may be detected with the aid of an acceleration sensor and/or a yaw-rate sensor. In this way, the measure derived from the position and actuation speed of the accelerator pedal may be used in a more differentiated manner for controlling the internal combustion engine or the drive.

DETAILED DESCRIPTION OF THE INVENTION

Figure 1:
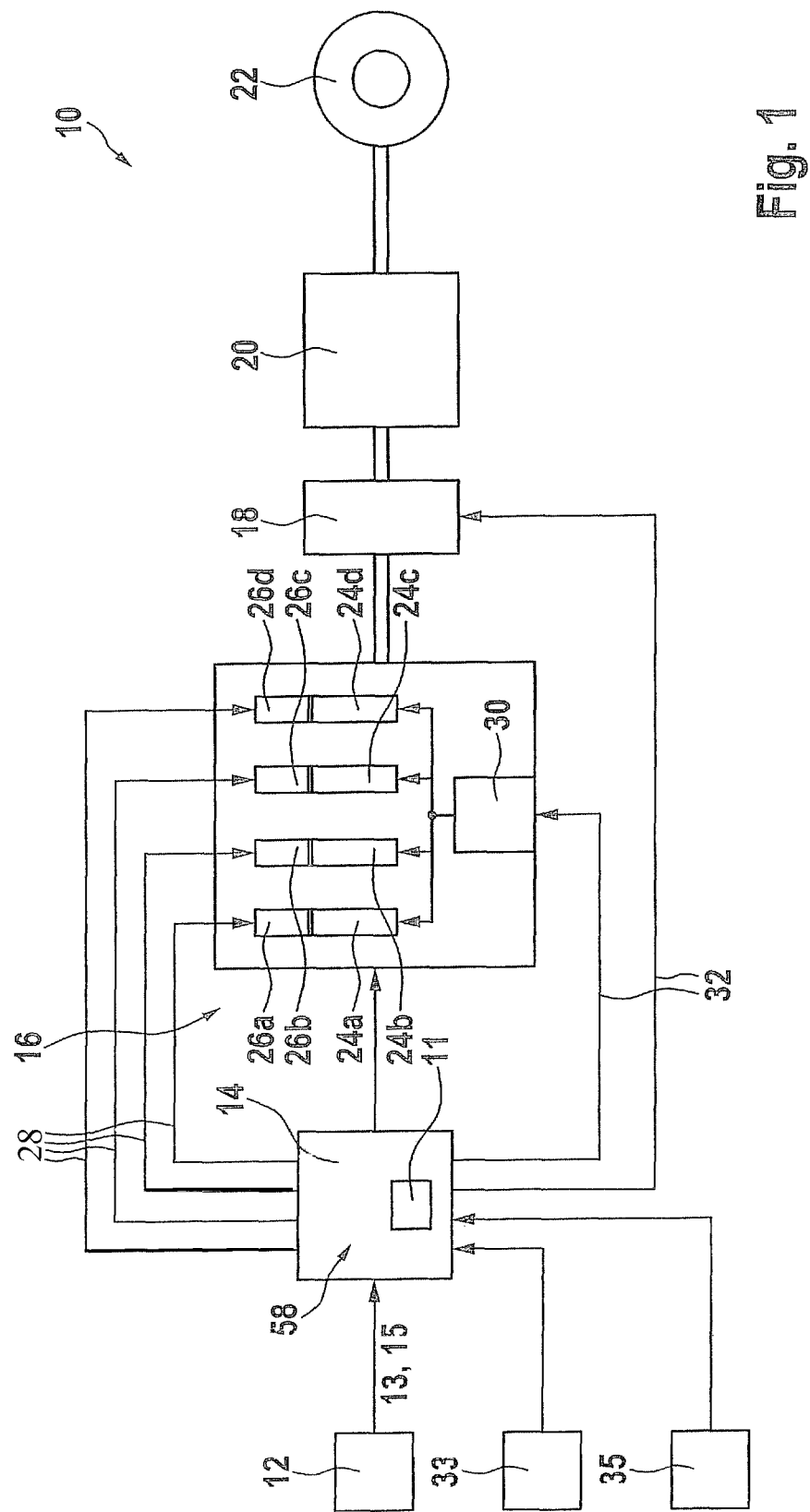
FIG. 1 shows a simplified schematic view of a motor vehicle having an internal combustion engine.

The same reference numerals are used for functionally equivalent elements and variables in all figures.

FIG. 1 shows a simplified schematic view of a motor vehicle 10. In the drawing, the following elements are shown from left to right: an accelerator pedal 12, a control and/or regulating device 14 having a memory in which a computer program 11 is stored, an internal combustion engine 16, a clutch 18, a transmission 20 and wheels 22 driven by transmission 20. In the present case, internal combustion engine 16 includes four cylinders 24a through 24d and fuel injectors 26a through 26d assigned to cylinders 24a through 24d. Fuel injectors 26a through 26d are controlled by control and/or regulating device 14 with the aid of control lines 28.

A throttle valve 30, which may be used to set the air supply of the four cylinders 24a through 24d, is shown symbolically in the lower area of the drawing of internal combustion engine 16. Control lines 32, which start at control and/or regulating device 14, are furthermore provided to set throttle valve 30, to actuate clutch 18 or to disengage clutch 18, at least as needed.

During operation of motor vehicle 10, control and/or regulating device 14 continuously ascertains position 13 of accelerator pedal 12, actuation speed 15 of accelerator pedal 12 and a direction of accelerator pedal actuation in the sense of power increase or power decrease. As a function of the ascertained variables, control and/or regulating device 14 may carry out at least one measure which influences the drag torque of internal combustion engine 16.

If control and/or regulating device 14 determines that actuation speed 15 of accelerator pedal 12 is less than a limiting value 58 and simultaneously that a position 13 of accelerator pedal 12 is greater than zero and simultaneously that accelerator pedal 12 is also actuated in the direction of a power reduction, control and/or regulating device 14 at least temporarily discontinues or reduces a fuel injection through fuel injectors 26a through 26d. At the same time, throttle valve 30 is opened all the way. Alternatively, clutch 18 is set in such a way that the transmission of force between internal combustion engine 16 and transmission 20 is interrupted. In this case, internal combustion engine 16 is also operated in an idle mode. In both cases, a so-called sailing mode is set, in which motor vehicle 10 is supposed to continue to travel, for as long as possible, without or with a reduced energy supply—albeit at decreasing speed.

In addition, data of a GPS 33 (global positioning system), which is shown in the left area of the drawing, and a yaw-rate sensor 35 are evaluated to ascertain the course of the road and current traffic situation. For example, if it is apparent from the ascertained data that motor vehicle 10 is traveling downhill, the position of throttle valve 30 is changed in such a way that a speed of motor vehicle 10 remains at least approximately the same.

If, in another case, control and/or regulating device 14 determines that actuation speed 15 of accelerator pedal 12 is greater than limiting value 58 and simultaneously that position 13 of accelerator pedal 12 is reduced to zero, the fuel injection into cylinders 24a through 24d with the aid of fuel injectors 26a to 26d is at least temporarily discontinued or reduced. At the same time, at least one measure which increases the drag torque of internal combustion engine 16 is carried out. In the present case, throttle valve 30 of internal combustion engine 16 is closed for this purpose. In this way, a particularly high drag torque is generated, after which the vehicle speed of motor vehicle 10 is reduced comparatively quickly.

Figure 2:
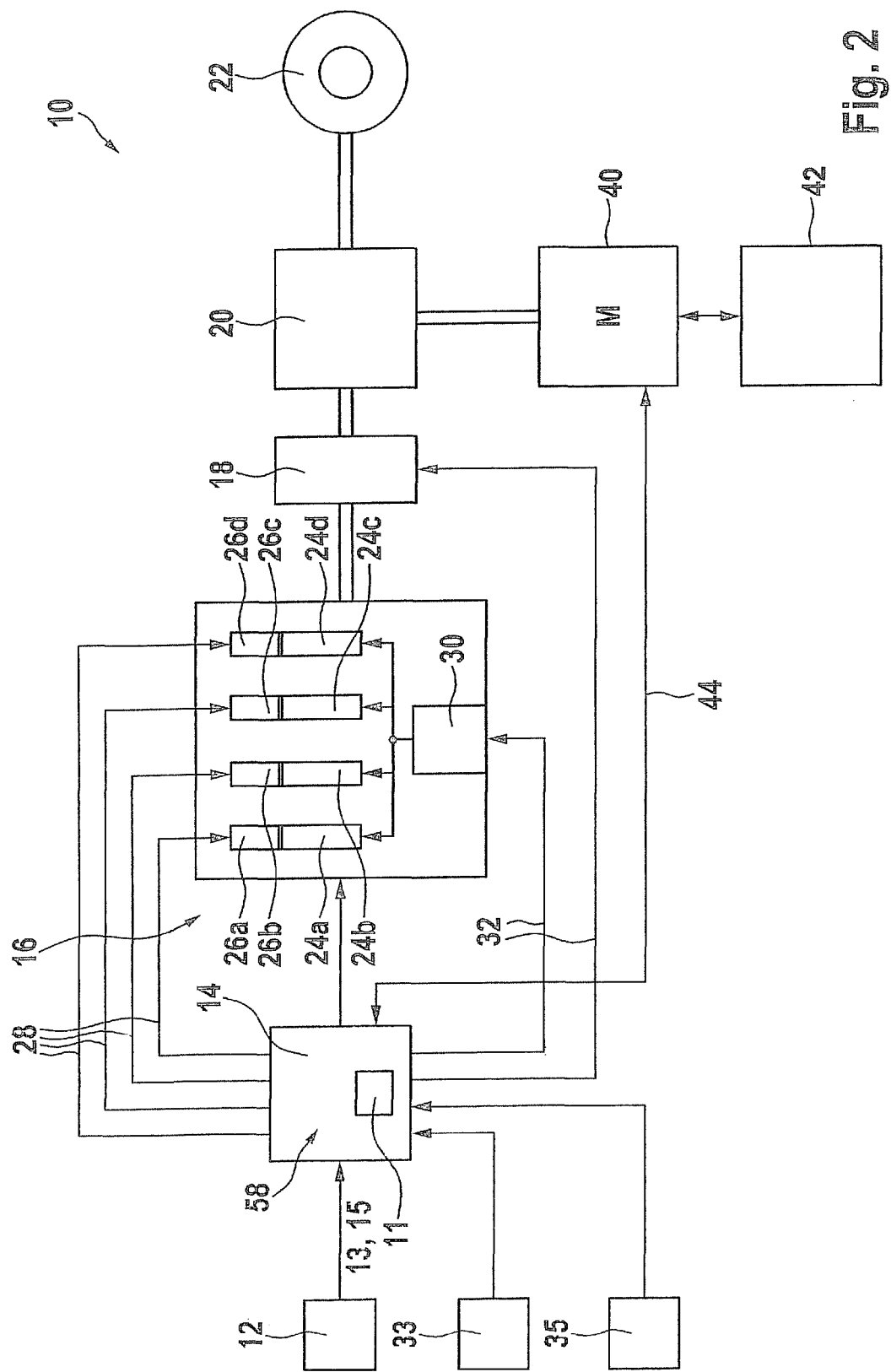
FIG. 2 shows a simplified schematic view of a motor vehicle having a hybrid drive.

FIG. 2 shows a motor vehicle 10 which is similar to the one in FIG. 1, motor vehicle 10 in FIG. 2 having a hybrid drive. In addition, motor vehicle 10 therefore includes an electric motor 40, a battery 42 and control lines 44 for controlling electric motor 40 with the aid of control and/or regulating device 14. Electric motor 40, which may also operate as a generator, is mechanically connected to transmission 20 and electrically connected to battery 42.

During operation of motor vehicle 10 according to FIG. 2, other measures in addition to the measures described in FIG.

1 may be carried out which are performed together with electric motor 40. In a sailing mode of internal combustion engine 16, electric motor 40 may support the sailing mode with the aid of comparatively little driving power and keep the vehicle speed of motor vehicle 10 constant or allow motor vehicle 10 to coast for a particularly long time.

In a coasting mode of motor vehicle 10, electric motor 40 may operate as a generator and draw mechanical power from transmission 20 and transmit it as electrical power to battery 42. In doing so, clutch 18 is preferably opened.

Figure 3:
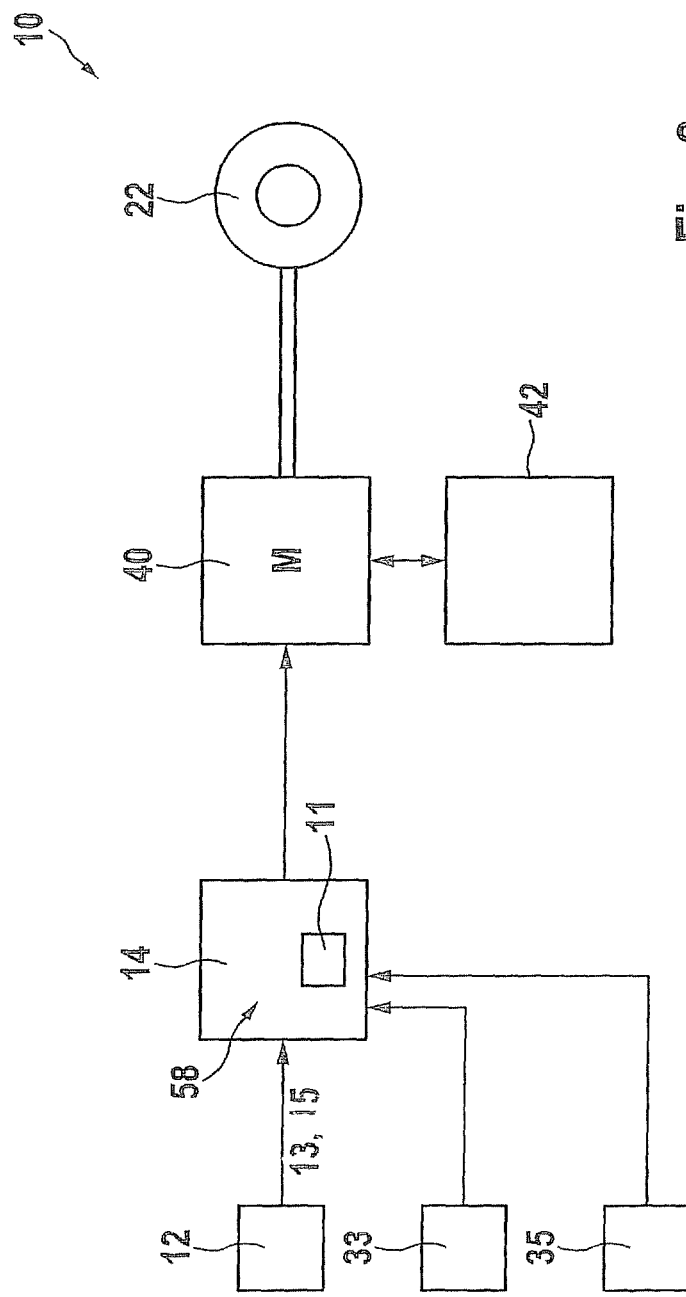
FIG. 3 shows a simplified schematic view of a motor vehicle having an electric drive.

FIG. 3 shows another embodiment of motor vehicle 10, which has an electric drive. Variables 13 and 15 of accelerator pedal 12 are continuously ascertained by control and/or regulating device 14 and used to control the drive, which in the present case is an electric motor 40. Electric motor 40 acts upon wheels 22. In motor mode, electric motor 40 receives electrical energy from battery 42; in generator mode, electric motor 40 supplies electrical energy to battery 42.

If a sailing mode is set on the basis of the variables of accelerator pedal 12 ascertained by control and/or regulating device 14, the supply of electrical energy from battery 42 to electric motor 40 may be interrupted in a first alternative, and motor vehicle 10 may thus coast at an ever slower speed. Alternatively, electric motor 40 and battery 42 may be used to maintain an approximately constant vehicle speed of motor vehicle 10 in sailing mode. In an essentially flat or inclined course of the roadway, electric motor 40 withdraws electrical energy from battery 42 to maintain the speed of motor vehicle 10.

During downhill travel, electric motor 40 may be used to generate a drag torque to maintain a constant vehicle speed of motor vehicle 10. Electric motor 40 operates as a generator and may feed electrical energy into battery 42.

If a coasting mode is set in control and/or regulating device 14, electric motor 40 operates as a generator and is able to advantageously store the energy taken from wheels 22 as electrical energy in battery 42. The amount of drag torque may be changed with the aid of electrical variables.

Figure 4:
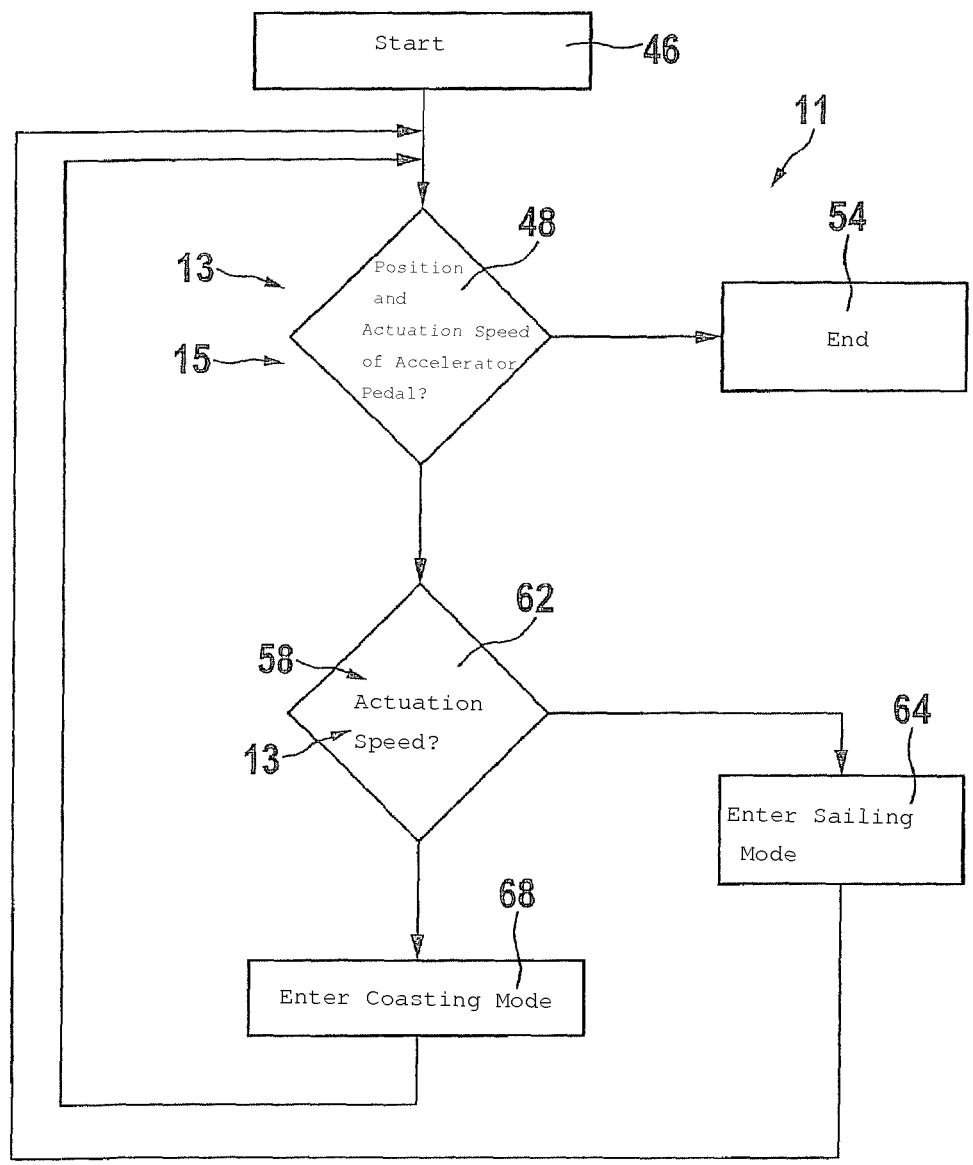
FIG. 4 shows a flow chart for a computer program for execution on a control and/or regulating device of the motor vehicle.

FIG. 4 shows a highly simplified flow chart to be processed by computer program 11 for carrying out the method. In the drawing, the processing essentially takes place from top to bottom. In the present case, the flow chart is designed for operating a motor vehicle 10 according to FIG. 1. The procedure begins in a starting block 46.

Position 13 and actuation speed 15 of accelerator pedal 12 are ascertained and evaluated in a query block 48. If actuation speed 15 is positive for the purpose of a desired acceleration of motor vehicle 10, or if actuation speed 15 is zero and position 13 of acceleration pedal 12 is simultaneously greater than zero, the program branches to an end block 54 and transfers to additional procedures (not shown in FIG. 4), with the aid of which the driving power of internal combustion engine 16 is to be kept constant or intensified. In the other cases, the program branches to a query block 62.

In query block 62, the program checks whether actuation speed 15 is less than or greater than a limiting value 58 and whether position 13 of accelerator pedal 12 is greater than zero. If actuation speed 15 is greater than limiting value 58, the program branches to a block 64. If actuation speed 15 is less than limiting value 58, the program branches to a block 68.

In block 64, the fuel injection into the combustion chambers of internal combustion engine 16 is greatly reduced and an idle mode of internal combustion engine 16 is set. Moreover, the position of throttle valve 30 is changed and/or clutch 18 is opened so that the vehicle speed decreases only slowly or remains approximately the same during downhill travel. This corresponds to a sailing mode of motor vehicle 10. The processing of the flow chart is then resumed after starting block 46.

In block 68, the fuel injection is also greatly reduced or even discontinued, and a measure which increases the drag torque is carried out. In the present case, throttle valve 30 is closed for this purpose. This corresponds to a coasting mode of motor vehicle 10. The processing of the flow chart is then also resumed after starting block 46.

What is claimed is:

1. A method for operating a motor vehicle having an internal combustion engine, comprising:
   detecting an actuation speed of an accelerator pedal; and
   influencing a drag torque as a function of the detected actuation speed, wherein at least one measure which influences the drag torque is carried out if the following conditions are all satisfied: (i) the actuation speed is less than a predefined limiting value, (ii) a position of the accelerator pedal is greater than zero, and (iii) the accelerator pedal is actuated in the direction of a power reduction.

2. The method as recited in claim 1, wherein the measure includes discontinuation of fuel injection into the internal combustion engine and influencing the position of a throttle valve of the internal combustion engine.

3. The method as recited in claim 2, wherein the influencing of the position of the throttle valve includes completely opening the throttle valve.

4. The method as recited in claim 2, wherein the influencing of the position of the throttle valve includes changing the position of the throttle valve to maintain the speed of the motor vehicle.

5. The method as recited in claim 1, wherein the measure includes opening a clutch which connects wheels of the motor vehicle to the internal combustion engine driving the motor vehicle.

6. The method as recited in claim 5, wherein the internal combustion engine is operated in idle mode when the clutch is open.

7. The method as recited in claim 1, wherein the measure includes generation of a driving torque with the aid of an electric motor.

8. The method as recited in claim 1, wherein no fuel is injected and at least one measure which increases the drag torque is carried out if the actuation speed is greater than the limiting value and the position of the accelerator pedal is reduced to zero.

9. The method as recited in claim 8, wherein a torque which increases the drag torque is generated by one of an electric motor or generator.

10. The method as recited in claim 9, wherein a throttle valve of the internal combustion engine which drives the motor vehicle is closed as the measure which increases the drag torque.

11. The method as recited in claim 1, wherein the measure is a function of at least one of a course of the road and a traffic situation.

12. The method as recited in claim 11, wherein the course of the road is ascertained from data of at least one of a GPS and a yaw-rate sensor.

13. A non-transitory computer-readable data storage medium storing a computer program having program codes which, when executed on a computer, performs a method for operating a motor vehicle having an internal combustion engine, the method comprising:
   detecting an actuation speed of an accelerator pedal; and influencing a drag torque as a function of the detected actuation speed, wherein at least one measure which influences the drag torque is carried out if the following conditions are all satisfied: (i) the actuation speed is less than a predefined limiting value, (ii) a position of the accelerator pedal is greater than zero, and (iii) the accelerator pedal is actuated in the direction of a power reduction.

14. A control device of an internal combustion engine of a motor vehicle, comprising:
   means for detecting an actuation speed of an accelerator pedal; and
   means for influencing a drag torque as a function of the detected actuation speed, wherein at least one measure which influences the drag torque is carried out if the following conditions are all satisfied: (i) the actuation speed is less than a predefined limiting value, (ii) a position of the accelerator pedal is greater than zero, and (iii) the accelerator pedal is actuated in the direction of a power reduction.

* * * * *